United States Patent [19]

Brittain et al.

[11] Patent Number: 5,190,363
[45] Date of Patent: Mar. 2, 1993

[54] DRIVE WHEEL FOR A BELTED TRACK CRAWLER

[75] Inventors: Robert W. Brittain; Charles D. Olson, both of Dubuque, Iowa

[73] Assignee: Deere & Company, Moline, Ill.

[21] Appl. No.: 925,548

[22] Filed: Aug. 5, 1992

Related U.S. Application Data

[63] Continuation of Ser. No. 696,680, May 7, 1991, abandoned.

[51] Int. Cl.$^5$ .......................................... B62D 55/084
[52] U.S. Cl. .......................................... 305/57; 305/29
[58] Field of Search .................. 305/35 R, 35 EB, 38, 305/39, 56, 57, 11, 13, 29

[56] References Cited

U.S. PATENT DOCUMENTS

| | | | |
|---|---|---|---|
| 3,112,727 | 12/1963 | Kiefer | 305/35 EB |
| 4,241,956 | 12/1980 | Meisel, Jr. | 305/57 X |
| 4,640,377 | 2/1987 | Wossner | 305/39 X |
| 4,818,041 | 4/1989 | Oertley | 305/56 |
| 4,884,852 | 12/1989 | Edwards et al. | 305/35 EB |

FOREIGN PATENT DOCUMENTS

WO85/02824 7/1985 PCT Int'l Appl. .
8803624 5/1988 World Int. Prop. O. .

OTHER PUBLICATIONS

Photograph taken at John Deere Waterloo PEC, dated Jan. 1989.

Primary Examiner—Russell D. Stormer

[57] ABSTRACT

The invention is directed to a drive wheel for a belted track crawler having circumferentially spaced frictional engagement elements. Adjacent frictional engagement elements define circumferential gaps in the wheel for removing mud and debris from the track wheel interface. Furthermore the frictional engagement elements are detachably mounted to mounting plates on the wheel hub.

15 Claims, 2 Drawing Sheets

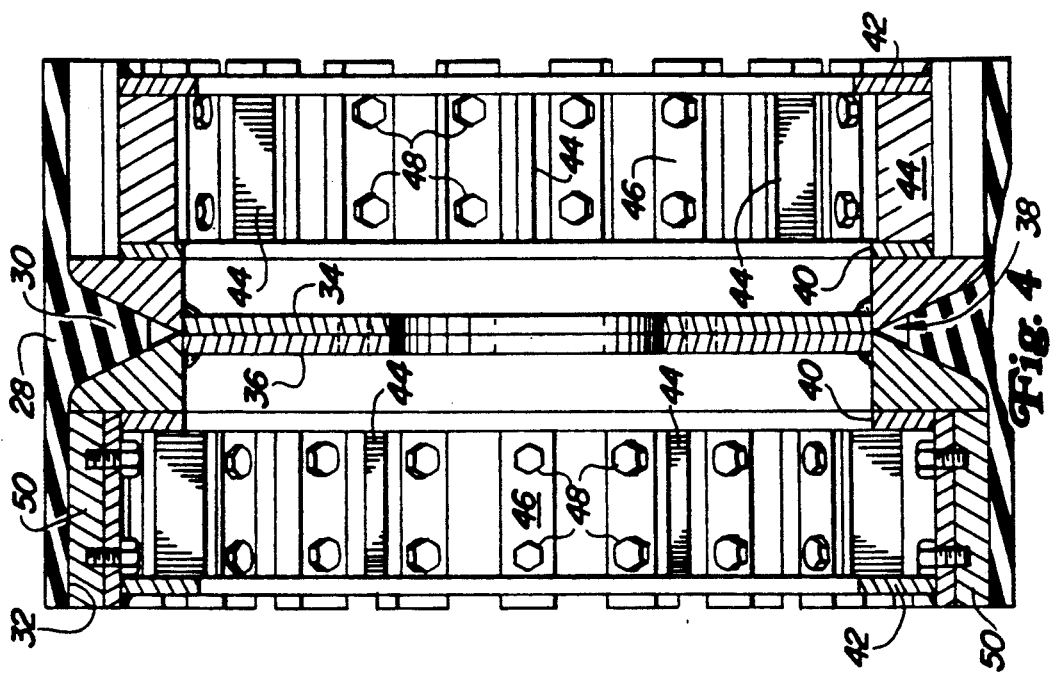
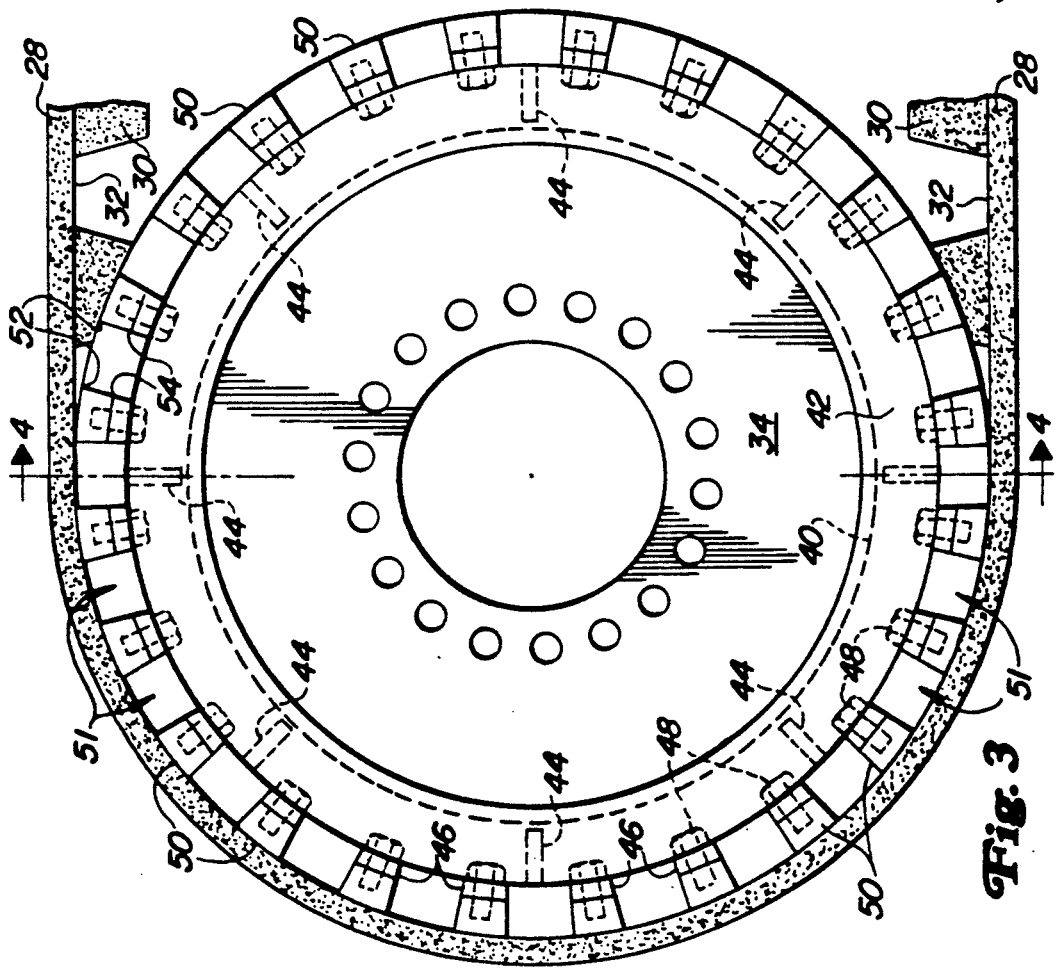

DRIVE WHEEL FOR A BELTED TRACK CRAWLER

This application is a continuation of application Ser. No. 07/696,680, filed May 7, 1991, now abandoned.

BACKGROUND OF THE INVENTION

1. Field of the Invention

The present invention is directed to a drive wheel for a frictionally driven belted track crawler, wherein the drive wheel is provided with a plurality of circumferentially spaced frictional engagement elements for engaging the flat surface of the belted track.

2. Description of the Prior Art

Conventional crawlers are well known and are typically provided with steel segmented track consisting of steel track shoes that are mounted to steel track chain. The track chain is positively driven by a drive sprocket which is coupled through a transmission to an internal combustion engine.

It has long been proposed to form endless belted tracks from elastomeric material. Such tracks have a number of advantages, one such advantage is that the belted tracks permit a crawler to drive over streets and curbs without ripping up the streets and curbs with the steel grousers of conventional tracks. A frictionally driven belted track system is currently marketed by Caterpillar Tractor Co. of Peoria, Ill. on an agricultural tractor, see PCT Application W085/02824. With this track system, the belted track engages a rubber coated main drive wheel located at the rear of the crawler and a pneumatic tire idler wheel located at the front of the tractor. The track is provided with a centering guide lug and flat surfaces to engage the rubber coated portions of the main drive wheel.

Frictionally driven belted track system are subject to slippage between the main drive wheel and the track. As such, the belted track is put under great tension to increase the normal force between the main drive wheel and the track to reduce slippage. Slippage still may occur under increased tension force, as the track and drive wheel become covered with mud, slime, water and other slippery materials. Scrapers for scraping mud from the track and main drive wheel may be used to reduce this problem. In addition main drive wheels having drain openings have also been proposed to further alleviate at least some of this problem. Another proposal for reducing slippage is to drive the idler wheel, as disclosed in U.S. Pat. No. 4,986,377.

SUMMARY

It is an object of the present invention to provide a main drive wheel for a belted track crawler having superior frictional engagement with the belted track.

It is a feature of the present invention that the drive wheel is provided with a plurality of detachable frictional engagement elements which define gaps between adjacent elements.

It is another feature of the present invention that the frictional engagement elements are formed from nodular iron in which is embedded tungsten carbide.

The main drive wheel comprises a hub having a left hand portion and a right hand portion. Both portions are joined together to form a central guide groove for the guide lugs on the endless track. Each portion is provided with an inner flange and an outer flange that are joined together by radial reinforcing members and circumferential mounting plates. The mounting plates are arranged about the circumference of the inner and outer flanges. Each of the mounting plates are provided with two mounting apertures for receiving mounting bolts. Circumferential gaps are formed by the adjacent mounting plates.

Frictional engagement elements are detachable mounted to the mounting plates by the mounting bolts. These frictional engagement elements form a circumferential surface for engaging and driving the flat inner surface of the belted track. The frictional engagement elements are hardened metal pieces having a rough surface providing a good coefficient of friction with the belted track. One material that has proved satisfactory is nodular iron having tungsten carbide embedded in it. In addition, by mounting the engagement elements on the mounting plates circumferential gaps are formed which permit mud and other debris to fall out of the main drive wheel/track interface.

BRIEF DESCRIPTION OF THE DRAWINGS

FIG. 3 is a side view of the main drive wheel.

FIG. 4 is a front cross sectional view of the main drive wheel taken along line 4—4.

DETAILED DESCRIPTION

Figure 1:
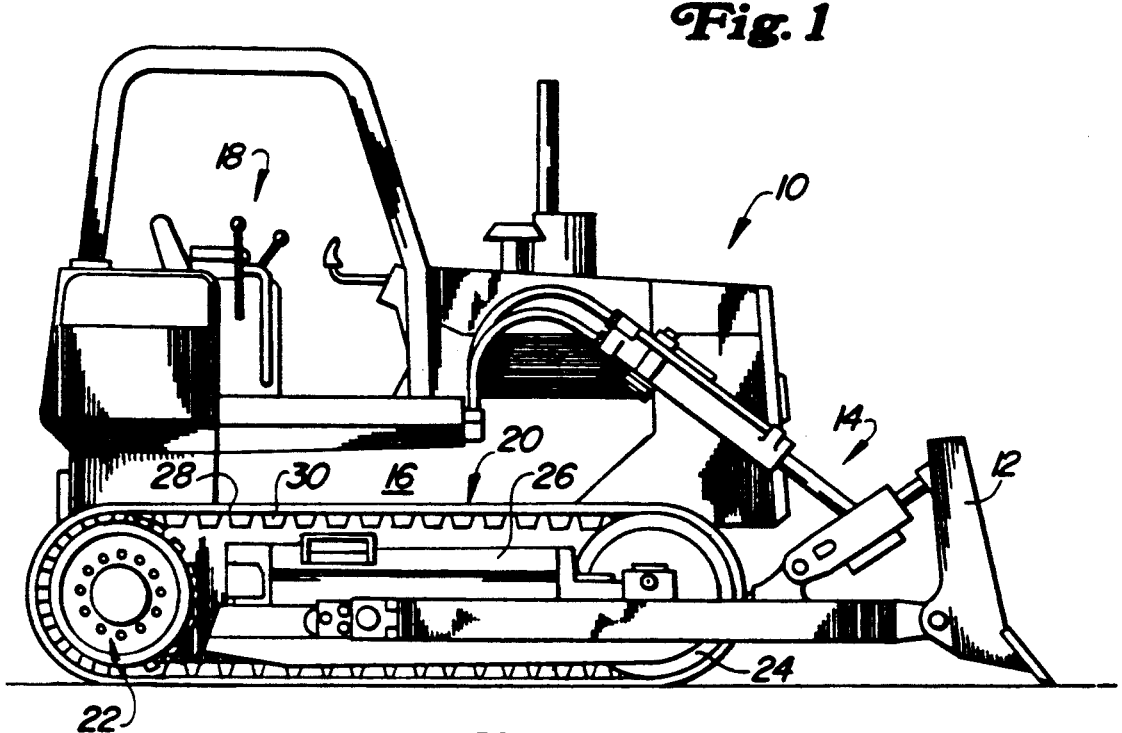
FIG. 1 is a side view of a crawler having an elastomeric belted track and the drive wheel of the present invention.

FIG. 1 illustrates a crawler 10 having a bulldozer blade 12 which is coupled to the crawler by linkage 14. The crawler is provided with a frame 16 housing an internal combustion engine and transmission, and defining operators station 18. The crawler is driven by an elastomeric belted track 20 which engages main drive wheel 22 located at the rear of the crawler and idler wheel 24 located at the front of the crawler. The track is tensioned by tension and recoil assembly 26.

The belted track is provided with a flat belted portion 28 having inwardly extending guide lugs 30 and outwardly extending grousers (not shown). The guide lugs project into guide channel formed in the main drive wheel and idler wheel. The flat inner surface 32 of the track extending laterally outward from the guide lug engages the circumferential surface defined by the frictional engagement elements of the main drive wheel for driving the track.

Figure 2:
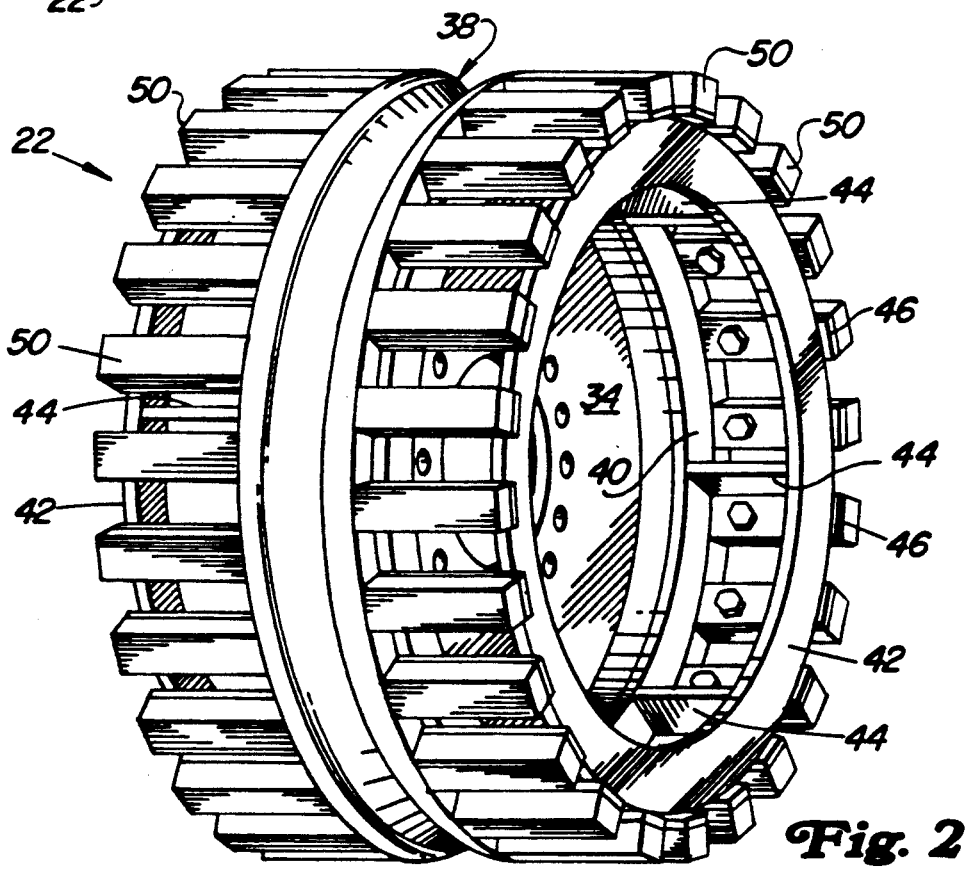
FIG. 2 is a perspective view of the main drive wheel.

The main drive wheel as illustrated in FIGS. 2-4 is provided with a right hand hub portion 34 and a left hand hub portion 36 that are coupled together to form circumferential guide channel 38. Each portion is provided with inner and outer circular flanges 40 and 42, respectively. The inner and outer flanges are coupled to one another by radial reinforcing members 44 and circumferential mounting plates 46.

Each mounting plate is provided with two mounting apertures through which mounting bolts 48 are inserted for mounting the frictional engagement elements 50 to the mounting plates. The outer surface of the frictional engagement elements defines a circumferential surface which engages the flat inner surface 32 of the track for driving the track and thereby the vehicle. Adjacent frictional engagement elements define circumferential gaps 51 which allow mud and other debris to fall through the gaps and out of the main drive wheels.

The frictional engagement elements 50 are hardened metal pieces having a rough texture for providing good frictional contact with the belted track. One material that has proved satisfactory is formed from nodular iron having tungsten carbide embedded in it. Such a material is disclosed in U.S. Pat. No. 4,936,912, which is incorporated herein by reference.

As illustrated in FIG. 3, the sidewalls of the frictional engagement elements 50 are angled to reduce mud packing between the elements. The distance between the top edges 52 of adjacent elements is less than the distance between the bottom edges 54 of the same adjacent elements. Such a configuration reduces the likelihood of mud packing between the elements as the open area between adjacent elements increases as the mud is pushed radially inward from the outer circumferential surface of the wheel.

The present invention should not be limited to the above-described embodiments, but should be limited solely by the claims that follow.

We claim:

1. A crawler vehicle comprising:
   a frame;
   a pair of main drive wheels connected to opposite sides of the frame, each of the drive wheels is provided with a hub having a circumference, the hub having a central guide groove in the circumference of the hub, extending laterally outward from the guide groove are a plurality of frictional engagement elements, the engagement elements are detachably mounted to the hub and define the engagement surface of the main drive wheel, circumferential gaps are formed by adjacent engagement elements;
   a pair of idlers connected to opposite sides of the frame, each of the idlers are longitudinally aligned with a corresponding main drive wheel;
   a pair of endless belted tracks, one endless belted track engaging a longitudinally aligned idler and main drive wheel and the other endless belted track engaging the other longitudinally aligned idler and main drive wheel, each endless track is provided with a centering guide lug for engaging the guide groove of the main drive wheel and a flat drive portion extending outwardly from the lug for engaging the frictional engagement elements, whereby the circumferential gaps permit material trapped between the tracks and the main drive wheels to fall through the circumferential gaps and out of the main drive wheels.

2. A crawler as defined by claim 1 wherein the hub is provided with a plurality of mounting plates corresponding to the frictional engagement elements, circumferential gaps are formed by the mounting plates that correspond to the circumferential gaps formed by the engagement elements.

3. A crawler as defined by claim 2 wherein each mounting plate is provided with two mounting apertures through which two mounting bolts project for detachably mounting the engagement elements to the hub.

4. A crawler as defined by claim 1 wherein the hub is provided with a lefthand portion and a right hand portion which are coupled together to define the central guide groove.

5. A crawler as defined by claim 4 wherein both the left hand portion and the right hand portion of the hub are provided with an inner flange and an outer flange across which are mounted a plurality of mounting plates corresponding to the engagement elements.

6. A crawler as defined by claim 5 wherein circumferential gaps are formed by the mounting plates that correspond to the circumferential gaps formed by the engagement elements.

7. A crawler as defined by claim 6 wherein each mounting plate is provided with two mounting apertures through which two mounting bolts project for detachably mounting the engagement elements to the hub.

8. A crawler as defined by claim 7 wherein the frictional engagement surfaces comprise nodular iron in which tungsten carbide is embedded.

9. A crawler as defined by claim 1 wherein each engagement element has two sidewalls having top edges and bottom edges, the top edges of adjacent engagement elements are spaced closer than the bottom edges of adjacent engagement elements to reduce the likelihood of mud packing between the engagement elements.

10. A drive wheel for a belted track crawler wherein the endless belted track is provided with guide lugs and flat engagement surfaces for the drive wheel, the drive wheel comprising:
    a hub having a left hand portion and a right hand portion which are coupled together to define a central guide groove in the circumference of the drive wheel, the central guide groove engages guide lugs of an endless belted track; and
    a plurality of frictional engagement elements, the engagement elements are detachably mounted on either side of the central guide groove on both the left hand and right hand portions of the hub, the engagement elements define the engagement surface of the main drive wheel for engaging a flat portion of an endless belted track, circumferential gaps are formed between adjacent engagement elements, whereby the circumferential gaps permit material trapped between the track and the drive wheel to fall through the circumferential gaps and out of the drive wheel.

11. A drive wheel as defined by claim 10 wherein both the left hand portion and the right hand portion of the hub are provided with an inner flange and an outer flange across which are mounted a plurality of mounting plates corresponding to the engagement elements.

12. A drive wheel as defined by claim 11 wherein circumferential gaps are formed by the mounting plates that correspond to the circumferential gaps formed by the engagement elements.

13. A drive wheel as defined by claim 12 wherein each mounting plate is provided with two mounting apertures through which two mounting bolts project for detachably mounting the engagement elements to the hub.

14. A drive wheel as defined by claim 10 wherein each engagement element has two sidewalls having top edges and bottom edges, the top edges of adjacent engagement elements are spaced closer than the bottom edges of adjacent engagement elements to reduce the likelihood of mud packing between the engagement elements.

15. A drive wheel for a belted track crawler wherein the endless belted track having a flat engagement surface for the drive wheel, the drive wheel comprising:
    a hub having an outer circumference; and
    a plurality of frictional engagement elements mounted to the outer circumference of the hub, circumferential gaps are formed by adjacent engagement elements, the engagement elements having sidewalls with top edges and bottom edges, the top edges of adjacent engagement elements are spaced closer than the bottom edges of adjacent engagement elements to reduce the likelihood of mud packing in the circumferential gaps between the engagement elements, whereby the circumferential gaps permit material trapped between the tracks and the main drive wheels to fall through the circumferential gaps and out of the drive wheel.

* * * * *